(12) United States Patent
Yamamoto et al.

(10) Patent No.: US 9,446,654 B2
(45) Date of Patent: Sep. 20, 2016

(54) VEHICLE AIR CONDITIONER

(71) Applicant: DENSO CORPORATION, Kariya, Aichi-pref. (JP)

(72) Inventors: Masakazu Yamamoto, Nagoya (JP); Ryosuke Yonekawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/424,847

(22) PCT Filed: Aug. 23, 2013

(86) PCT No.: PCT/JP2013/004990
§ 371 (c)(1),
(2) Date: Feb. 27, 2015

(87) PCT Pub. No.: WO2014/034066
PCT Pub. Date: Mar. 6, 2014

(65) Prior Publication Data
US 2015/0202941 A1   Jul. 23, 2015

(30) Foreign Application Priority Data
Aug. 31, 2012  (JP) ................................ 2012-191138

(51) Int. Cl.
*B60H 1/00*   (2006.01)

(52) U.S. Cl.
CPC . *B60H 1/00064* (2013.01); *B60H 2001/00092* (2013.01); *B60H 2001/00121* (2013.01); *B60H 2001/00135* (2013.01)

(58) Field of Classification Search
CPC ............... B60H 1/00064; B60H 2001/00121; B60H 2001/00092; B60H 2001/00135

USPC ........................................ 62/239, 244, 238.1
See application file for complete search history.

(56) References Cited

U.S. PATENT DOCUMENTS 3,008,694 A * 11/1961 Todd .................. B60H 1/00371
165/11.1
6,045,444 A * 4/2000 Zima .................. B60H 1/00028
165/103

(Continued)

FOREIGN PATENT DOCUMENTS

JP   S509953 A   1/1975
JP   61044017 A  3/1986

(Continued)

OTHER PUBLICATIONS

Office Action dated Nov. 24, 2015 in corresponding Japanese Application No. 2012-191138 with English translation.

(Continued)

*Primary Examiner* — Mohammad M Ali
(74) *Attorney, Agent, or Firm* — Harness, Dickey & Pierce, P.L.C.

(57) ABSTRACT

In a vehicle air conditioner, a first warm air diversion passage is a tunnel-shaped passage that is provided near a first side air outlet and takes in warm air and causes the air to flow without mixing with cool air. A second warm air diversion passage is a passage inside a tunnel that is provided near a second side air outlet and takes in warm air and causes the air to flow without mixing with cool air. A diversion passage section includes an in-tunnel guide wall that directs the warm air flowing through the first warm air diversion passage toward the first side air outlet, and an in-tunnel guide wall that directs the warm air flowing through the second warm air diversion passage toward the second side air outlet.

4 Claims, 6 Drawing Sheets

(56) References Cited

U.S. PATENT DOCUMENTS

| | | | |
|---|---|---|---|
| 6,273,811 B1* | 8/2001 | Pawlak, III | B60H 1/00692 165/42 |
| 6,382,305 B1* | 5/2002 | Sano | B60H 3/0608 165/103 |
| 6,482,081 B2* | 11/2002 | Vincent | B60H 1/00064 165/42 |
| 6,547,152 B1* | 4/2003 | Pawlak, III | B60H 1/00028 165/41 |
| 6,953,081 B2* | 10/2005 | Klingler | B60H 1/00328 165/122 |
| 7,407,001 B2* | 8/2008 | Newman | B60H 1/00028 165/202 |
| 2002/0042248 A1* | 4/2002 | Vincent | B60H 1/00064 454/121 |
| 2005/0077038 A1* | 4/2005 | Perry | B60H 1/00678 165/202 |
| 2005/0082052 A1* | 4/2005 | Abdeljawad | B60H 1/00064 165/203 |
| 2006/0065388 A1* | 3/2006 | Newman | B60H 1/00028 165/202 |
| 2008/0256966 A1 | 10/2008 | Kawashima et al. | |
| 2009/0038774 A1 | 2/2009 | Ogiso et al. | |
| 2011/0105007 A1* | 5/2011 | Jia | B60H 1/00064 454/121 |

FOREIGN PATENT DOCUMENTS

| | | |
|---|---|---|
| JP | 2000318441 A | 11/2000 |
| JP | 2004249945 A | 9/2004 |
| JP | 2004338613 A | 12/2004 |
| JP | 2005138735 A | 6/2005 |
| JP | 2007125955 A | 5/2007 |
| JP | 2008143514 A | 6/2008 |
| JP | 2008-149866 | 7/2008 |
| JP | 4178685 B2 | 11/2008 |
| JP | 2009-040304 | 2/2009 |
| JP | 2009143330 A | 7/2009 |
| JP | 2009227026 A | 10/2009 |

OTHER PUBLICATIONS

International Search Report and Written Opinion (in Japanese with English Translation) for PCT/JP2013/004990, mailed Nov. 26, 2013; ISA/JP.

* cited by examiner

FIG. 6

VEHICLE AIR CONDITIONER

CROSS REFERENCE TO RELATED APPLICATIONS

This application is a U.S. National Phase Application under 35 U.S.C. 371 of International Application No. PCT/JP2013/004990 filed on Aug. 23, 2013 and published in Japanese as WO 2014/034066 A1 on Mar. 6, 2014. This application is based on and claims the benefit of priority from Japanese Patent Application No. 2012-191138 filed on Aug. 31, 2012. The entire disclosures of all of the above applications are incorporated herein by reference.

TECHNICAL FIELD

The present disclosure relates to a vehicle air conditioner that guides conditioned air to a predetermined air outlet within a vehicle compartment in accordance with an air outlet mode.

BACKGROUND ART

Disclosed in Patent Document 1 is a vehicle air conditioner which is provided with an air guide that guides a part of warm air which has been heated in a heater core to an air mix chamber without mixing with cool air. According to this conventional vehicle air conditioner, since the air guide leads the warm air to a defroster air outlet and upper air outlets on both side parts, temperatures of air blown out of the defroster air outlet and the upper air outlets on the both side parts can be increased.

Disclosed in Patent Document 2 is a vehicle air conditioner having a multi-layered air passage configured such that cool air passages in which only cool air flows and warm air passages in which only warm air flows are arranged to be stacked alternately. The cool air and the warm air, flowing out of the multiple-layered air passage, are mixed in a mixing portion provided inside an air conditioning duct and are subsequently supplied to respective air outlets.

Conventionally, in a vehicle air conditioner, it is desired to secure driver's view by putting a temperature distribution of blown air from a defroster air outlet into an appropriate state to prevent fogging of a window of a vehicle. In order to satisfy the desire, in the vehicle air conditioner of Patent Document 1, the air guide has a discharge port positioned at a center part of the defroster air outlet in a vehicle width direction, and guides are provided to lead the warm air to the upper air outlets on the both side parts. The temperatures of air blown out of the defroster air outlet and the upper air outlets on the both side parts can be increased.

PRIOR ART DOCUMENT

Patent Document

Patent Document 1: JP 61-44017 A
Patent Document 2: JP 4178685 B2

SUMMARY OF THE INVENTION

However, according to studies of the inventors of the present application, in the vehicle air conditioner of Patent Document 1, the air guide is disposed such that the discharge port is opposed to the center part of the defroster air outlet in the vehicle width direction. Thus, the warm air guided by the air guide may be more concentrated on the center part than on the both side parts in the vehicle width direction, and air temperature may become higher in the center part than the both side parts. Hence, unevenness in temperature of air blown out of the defroster air outlet with respect to the vehicle width direction may be produced, and effects to prevent the window fogging may not be able to be obtained over a wide area.

On the other hand, in the vehicle air conditioner of Patent Document 2, the unevenness in temperature of air blown out of the defroster air outlet with respect to the vehicle width direction can be reduced by increasing the number of the warm air passages adjacent to the cool air passages. However, if the number of the tunnel-like warm air passages is increased excessively with firm commitment to equalization in temperature of air blown out of the defroster air outlet, area of the cool air passages may be reduced, and a flow rate of the cool air may be reduced. Accordingly, a balance between the flow rate of the cool air and a flow rate of the warm air may be largely broken off, and the vehicle air conditioner may become impossible to perform air conditioning.

In consideration of the above-described points, it is an objective of the present disclosure to provide a vehicle air conditioner capable of reducing imbalance between cool air and warm air which are to be supplied to an air mixing portion and capable of limiting blowing of the warm air intensively from a center of a defroster air outlet in a vehicle width direction with regard to conditioned air blown out of the defroster air outlet into a vehicle compartment.

According to an aspect of the present disclosure, an air conditioner for a vehicle includes an air conditioning casing, a defroster air outlet, a cooling heat exchanger, a heating heat exchanger, a cool air passage, a warm air passage, a diversion passage section and an air mixing portion. The air conditioning casing has therein a passage through which a conditioned air flows to an inside of a vehicle compartment. The defroster air outlet is provided on the air conditioning casing, and the defroster air outlet is an outlet through which the conditioned air is blown toward a window in the vehicle compartment. The cooling heat exchanger is disposed inside the air conditioning casing, and the cooling heat exchanger absorbs heat from air passing therethrough and supplies cool air downstream in an air flow. The heating heat exchanger is disposed inside the air conditioning casing, and the heating heat exchanger radiates heat to air passing therethrough and supplies warm air downstream in an air flow. The cool air passage is provided in the air conditioning casing, and the cool air passage is a passage through which the cool air that has been cooled in the cooling heat exchanger flows. The warm air passage is provided in the air conditioning casing, and the warm air passage is a passage through which the warm air that has been heated in the heating heat exchanger flows. The diversion passage section is provided downstream of the cool air passage and the warm air passage in the air flow and upstream of the defroster air outlet in the air flow inside the air conditioning casing, and the diversion passage section includes a plurality of cool air diversion passages communicating with the cool air passage, and a plurality of warm air diversion passages communicating with the warm air passage. The air mixing portion is provided upstream of the defroster air outlet in the air flow inside the air conditioning casing, and the air mixing portion is a portion in which the cool air flowing out of the plurality of cool air diversion passages and the warm air flowing out of the plurality of warm air diversion passages are mixed with each other. The defroster air outlet includes a first side air outlet through which the conditioned air passes to be blown to one of both side parts in the vehicle width direction in the vehicle compartment, a second side air outlet through which the conditioned air passes to be blown to other of the both side parts in the vehicle width direction in the vehicle compartment, and a center air outlet provided between the first side air outlet and the second side air outlet in the vehicle width direction. The plurality of warm air diversion passages includes at least a first warm air diversion passage and a second warm air diversion passage that are separated from each other in the vehicle width direction. At least one of the plurality of cool air diversion passages is disposed adjacent to the first warm air diversion passage and the second warm air diversion passage between the first warm air diversion passage and the second warm air diversion passage in the vehicle width direction. The first warm air diversion passage is provided near the first side air outlet and is a passage through which the warm air from the warm air passage flows without mixing with the cool air flowing out of the cool air passage. The second warm air diversion passage is provided near the second side air outlet and is a passage through which the warm air from the warm air passage flows without mixing with the cool air flowing out of the cool air passage. The diversion passage section includes a first guide that directs the warm air flowing through the first warm air diversion passage toward the first side air outlet, and a second guide that directs the warm air flowing through the second warm air diversion passage toward the second side air outlet.

In this case, the first warm air diversion passage provided near the first side air outlet and the second warm air diversion passage provided near the second side air outlet are provided so as to be separated from each other and have a cool air diversion passage therebetween. Therefore, the cool air and the warm air can be made to flow without flowing intensively on a specific position (e.g., center part) in the vehicle width direction in the diversion passage section. Accordingly, the warm air and the cool air can be supplied to the air outlets without breaking off a balance in flow rate between the cool air and the warm air in the vehicle width direction, and a predetermined air-conditioning performance can be achieved.

Further, the air conditioner includes the first guide that directs the warm air, flowing through the first warm air diversion passage provided near the first side air outlet, toward the first side air outlet, and the second guide that directs the warm air, flowing through the second warm air diversion passage provided near the second side air outlet, toward the second side air outlet. Accordingly, the warm air flowing through the first warm air diversion passage and the warm air flowing through the second warm air diversion passage can be prevented from flowing intensively to the center air outlet. Thus, air flow rates of the warm air toward both side air outlets can be ensured. Therefore, according to the vehicle air conditioner of the present disclosure, imbalance between the cool air and the warm air which are supplied to the air mixing portion can be limited, and with regard to the conditioned air flowing out of the defroster air outlet into the vehicle compartment, flowing out of the warm air intensively from the center of the defroster air outlet in the vehicle width direction can be restricted. Thus, effects to prevent window fogging can be produced sufficiently over a wide range in the vehicle width direction.

EMBODIMENTS FOR EXPLOITATION OF THE INVENTION

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 1:
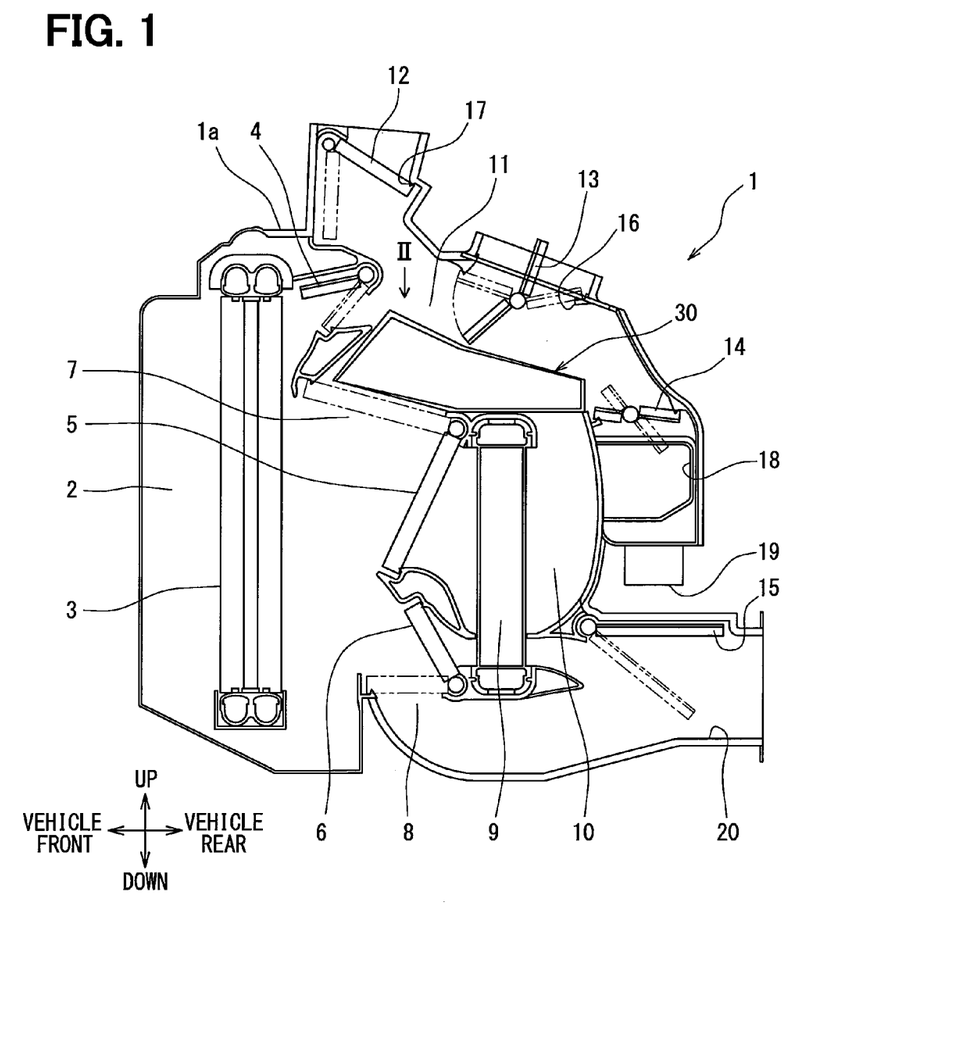
FIG. 1 is schematic sectional diagram showing an air conditioning casing of a vehicle air conditioner according to a first embodiment of the present disclosure.
Figure 2:
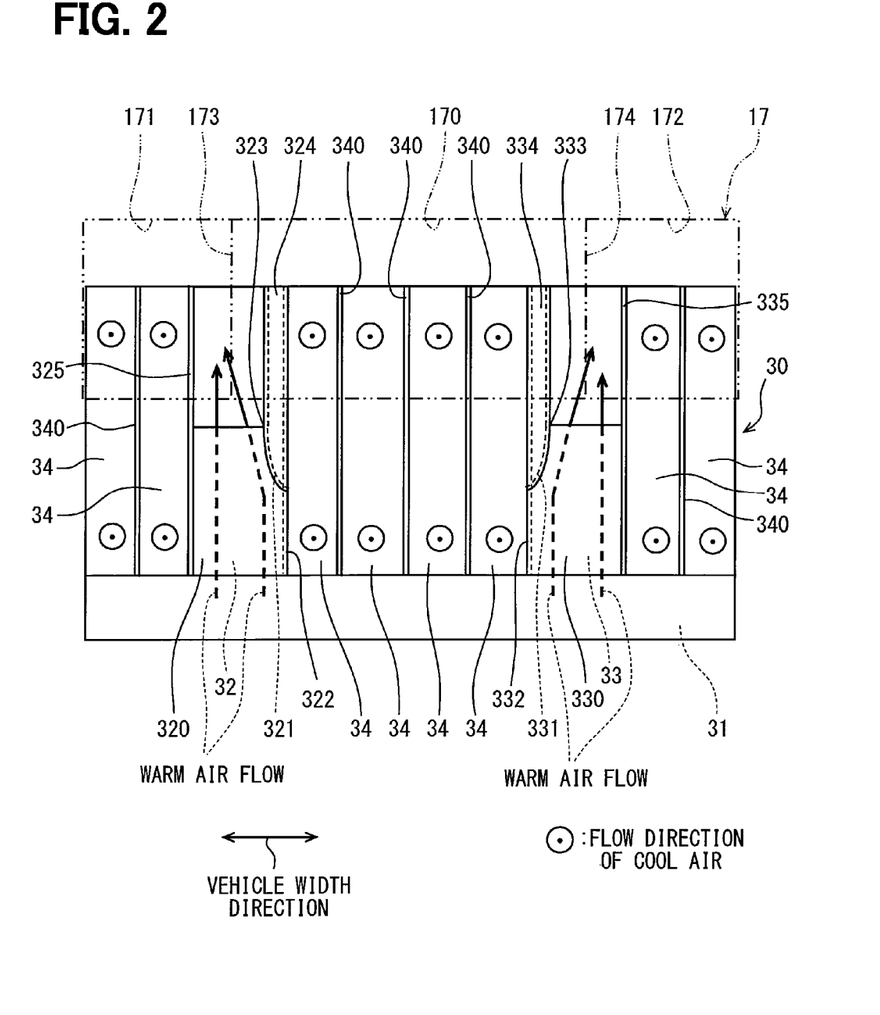
FIG. 2 is a schematic diagram showing a diversion passage section viewed from an arrow II of FIG. 1.

A first embodiment to which the present disclosure is applied will be described based on FIGS. 1 and 2. In FIG. 1, upper, lower, left and right on the drawing paper represent, respectively, vehicle upper, vehicle lower, vehicle front and vehicle rear. In FIG. 2, a right-left direction on the drawing paper represents a vehicle width direction.

As shown in FIG. 1, an air conditioning unit 1 of a vehicle air conditioner according to a first embodiment has an air conditioning casing 1a as an outer shell, and roughly includes an air blowing section and an air conditioning section. The air conditioning casing 1a is disposed on a back side of an instrumental panel located on a front part in a vehicle compartment. The air conditioning casing 1a is configured by multiple casing members that are molded products made of resin such as polypropylene. The multiple casing members are integrally bonded to each other by a fixing device such as a metallic spring or a screw, thereby constituting the air conditioning casing 1a.

The air blowing section includes a blower (not shown in the drawings) for blowing air from an outside of the vehicle compartment or an inside of the vehicle compartment to the air conditioning section, and an air outlet of the blower is connected to an air passage 2 that leads to an inlet of the air conditioning section. The blower includes, for example, a centrifugal multi-blade fan and a motor that drives the fan. The centrifugal multi-blade fan is surrounded by a scroll casing and communicates with the air passage 2 via a duct extending in a centrifugal direction of the centrifugal multi-blade fan.

The air conditioning section, inside the air conditioning casing 1a, includes an evaporator 3 disposed to cover an entire of the air passage 2 cross-sectionally, a heater core 9 that heats air which has passed through the evaporator 3, a cool air passage 7, multiple air mix doors, a warm air passage 10, a diversion passage section 30, and doors that open or close respective air outlets. Additionally, in the air conditioning casing 1a, multiple air outlets are provided on a downstream side of the cool air passage 7 and the warm air passage 10. In the air conditioning casing 1a, a front-face air outlet 16, a defroster air outlet 17, a front-foot air outlet 18, a rear-foot air outlet 19 and a rear-face air outlet 20.

The defroster air outlet 17 is positioned, for example, in an upper part on a vehicle front side of the air conditioning casing 1a and communicates with an in-vehicle air outlet through which a conditioned air is blown along an inner surface of the vehicle compartment such as a front window. The defroster air outlet 17 is an opening portion for reducing an extent of fogging of the front window or the like. The defroster air outlet 17 is opened or closed by a defroster door 12 in accordance with an air outlet mode and is opened in a defroster outlet mode.

As shown in FIG. 2, the defroster air outlet 17 includes a center air outlet 170, a first side air outlet 171 and a second side air outlet 172, which are arranged in the vehicle width direction. That is, the air conditioning casing 1a has three opening portions arranged in the vehicle width direction in the following order: the first side air outlet 171, the center air outlet 170 and the second side air outlet 172. The center air outlet 170 is an opening portion that is open in a center part of the defroster air outlet 17 in the vehicle width direction, and communicates with a center defroster air outlet that is open in a center part inside the vehicle compartment in the vehicle width direction. The center air outlet 170 is provided between the first side air outlet 171 and the second side air outlet 172 in the vehicle width direction. Supplied to the center air outlet 170 is a conditioned air that is to be blown mainly to a center part of the front window in the vehicle width direction for preventing fogging or the like.

The first side air outlet 171 is an opening portion that is adjacent to the center air outlet 170 within the defroster air outlet 17 and is open on one side of a vehicle width. The first side air outlet 171 communicates with a side defroster air outlet that is open on one end part in the vehicle width direction inside the vehicle compartment. Supplied to the first side air outlet 171 is a conditioned air that is to be blown mainly to one of both end parts of the front window in the vehicle width direction, a passenger's side window or the like for prevention of fogging. The second side air outlet 172 is an opening portion that is adjacent to the center air outlet 170 within the defroster air outlet 17 and is open on other side of the vehicle width. The second side air outlet 172 communicates with a side defroster air outlet that is open on other end part in the vehicle width direction inside the vehicle compartment. Supplied to the second side air outlet 172 is a conditioned air that is to be blown mainly to other of both end parts of the front window in the vehicle width direction, a driver's side window or the like for prevention of fogging.

The front-face air outlet 16 is, for example, positioned vehicle-frontward of the defroster air outlet 17 and is an opening portion communicating with an in-vehicle air outlet through which a conditioned air is blown toward an upper part of a passenger on a front seat. The front-face air outlet 16 is used in a cooling operation mainly. The front-face air outlet 16 is opened or closed by a front-face door 13 in accordance with the air outlet mode, and is open in a face outlet mode. The rear-face air outlet 20 is, for example, positioned in a lower part of the air conditioning casing 1a on a vehicle-rear side and is an opening portion communicating with an in-vehicle air outlet through which a conditioned air is blown to an upper part of a passenger on a rear seat. The rear-face air outlet 20 is used in the cooling operation mainly. The rear-face air outlet 20 is opened or closed by a rear-face door 15 in accordance with the air outlet mode, and is open in the face outlet mode.

The front-foot air outlet 18 is, for example, positioned on the vehicle-rear side of the air conditioning casing 1a and on a lower side of the defroster air outlet 17 and the front-face air outlet 16. The front-foot air outlet 18 is an opening portion communicating with an in-vehicle air outlet through which a conditioned air is blown to a foot area of the passenger on the front seat. The front-foot air outlet 18 is used in a heating operation mainly. The rear-foot air outlet 19 is, for example, positioned on the vehicle-rear side of the air conditioning casing 1a and adjacent to the front-foot air outlet 18. The rear-foot air outlet 19 is an opening portion communicating with an in-vehicle air outlet through which a conditioned air is blown to a foot area of the passenger on the rear seat. The rear-foot air outlet 19 is used in the heating operation mainly. An upstream passage that is common for the front-foot air outlet 18 and the rear-foot air outlet 19 is opened or closed by a foot door 14 in accordance with the air outlet mode, and is open in a foot outlet mode.

Operations of the blower, the multiple air mix doors, the defroster door 12, the front-face door 13, the rear-face door 15 and the foot door 14 are controlled by a controller that is not shown in the drawings.

The evaporator 3 is, for example, positioned on the vehicle-front side of the air conditioning casing 1a, and is an example of a cooling heat exchanger that receives blown air from the blower and evaporates a low-temperature and low-pressure refrigerant that has been depressurized in an expansion valve in a refrigeration cycle. The air passing around tubes, in which the refrigerant flows, is cooled, and the cooled air flows downstream through the cool air passage 7.

The heater core 9 is positioned in a lower part on a vehicle-rear side of the evaporator 3, and is an example of a heating heat exchanger that makes a high-temperature coolant of a vehicle-running engine exchange heat with air by using the coolant as a heat source and heats the air passing around the heating heat exchanger. The heater core 9 is disposed to cover partially a passage located on a downstream side of the evaporator 3 in an air flow direction and generates warm air by heating all or part of air that has passed through the evaporator 3.

The warm air passage 10 is provided downstream of the heater core 9. The warm air passage 10 is a passage extending vehicle-upward from an outlet of the heater core 9. The warm air passage 10 has a width dimension equivalent to an entire size of the air conditioning casing 1a in the vehicle width direction, and the width dimension is larger than a dimension in a vehicle front-rear direction. In other words, the warm air passage 10 is a flattened passage that is thin in the front-rear direction and elongated laterally and vertically. The warm air passage 10 is connected to a warm air diversion passage provided in the diversion passage section 30 in vicinity of an upper end part of the heater core 9.

A cool bypass door 4 is positioned on a vehicle-rear side of an upper part of the evaporator 3 and is a door capable of opening or closing a passage that leads to an air mixing portion 11. The cool bypass door 4 has a rotation shaft driven by a driving device such as a motor so as to open or close the passage, and accordingly, whether the cool air that has passed through the evaporator 3 is supplied to the air mixing portion 11 without passing through the diversion passage section 30 is controlled. For example, the cool bypass door 4 opens the passage in a largest cooling operation and supplies the cool air to the front-face air outlet 16.

A front air mix door 5 is positioned on a vehicle-rear side of the evaporator 3 and is a door capable of opening or closing the cool air passage 7 through which the air that has passed through the evaporator 3 flows and a passage located on an upstream of the heater core 9 communicating with the warm air passage 10. The front air mix door 5 has a rotation shaft driven by a driving device such as a motor so as to move toward the cool air passage 7 or the heater core 9, and accordingly an opening degree of each passage is adjusted. Therefore, positioning of the front air mix door 5 according to the opening degree adjusts a ratio between a flow rate (warm air flow late) of air passing through the heater core 9 and a flow rate (cool air flow rate) of air bypassing the heater core 9.

When the front air mix door 5 is located at a position (position on a side toward the heater core 9) shown by a solid line in FIG. 1, the largest cooling operation is performed, in which the front air mix door 5 closes the warm air passage 10 such that an air flow toward the heater core 9 is blocked totally, and accordingly cool air is provided to the vehicle compartment. In contrast, when the front air mix door 5 is located at a position (position on a side toward the cool air passage 7) show by an alternate long and two short dashes line, a largest heating operation is performed, in which the front air mix door 5 closes the cool air passage 7 such that all air that has passed through the evaporator 3 flows to the heater core 9 to be heated therein, and accordingly warm air is provided to the vehicle compartment. An opening degree position of the front air mix door 5 is determined by the controller in accordance with a set temperature and the air outlet mode in an automatic air conditioning or in accordance with a temperature and the air outlet mode which are set manually in a manual air conditioning.

A rear air mix door 6 is positioned vehicle-rearward of the evaporator 3 and downward of the front air mix door 5, and is a door capable of opening or closing a passage, which is located on an upstream side of the heater core 9 and communicates with a lower part of the heater core 9, and a rear-face passage 8, which is located downward of the heater core 9 and communicates with the rear-face air outlet 20. The rear air mix door 6 has a rotation shaft driven by a driving device such as a motor so as to move toward the rear-face passage 8 or the lower part of the heater core 9, and accordingly an opening degree of each passage is adjusted. Therefore, positioning of the rear air mix door 6 according to the opening degree adjusts a ratio between a flow rate (warm air flow late) of air passing through the heater core 9 and a flow rate (cool air flow rate) of air bypassing the heater core 9.

The diversion passage section 30 is, inside the air conditioning casing 1a, provided downstream of the cool air passage 7 and the warm air passage 10 in the air flow and upstream of the defroster air outlet 17 and the front-face air outlet 16 in the air flow. The diversion passage section 30 is a member configured to include multiple diversion passages arranged in the vehicle width direction.

The multiple diversion passages are configured to include multiple cool air diversion passages 34 communicating with the cool air passage 7, and multiple warm air diversion passages communicating with the warm air passage 10. As shown in FIG. 2, the multiple warm air diversion passages at least include a first warm air diversion passage 32 and a second warm air diversion passage 33 which are provided adjacent to the cool air diversion passages 34 and separated from each other so as to have therebetween multiple cool air diversion passages 34. At least one of the multiple cool air diversion passages 34 is disposed between the first warm air diversion passage 32 and the second warm air diversion passage 33 and is adjacent to the first warm air diversion passage 32 and the second warm air diversion passage 33. As shown in FIG. 2, the first warm air diversion passage 32 and the second warm air diversion passage 33 extend in a direction perpendicular to the vehicle width direction.

The air mixing portion 11 is a space portion provided upstream of the defroster air outlet 17 in the air flow, and is a space in which the cool air flowing from the evaporator 3 and the warm air that has heated in the heater core 9 are mixed with each other. Therefore, the cool air and the warm air, which have been flowed crossways without mixing each other in the diversion passage section 30, flow separately out of the diversion passage section 30 and mix with each other in the air mixing portion 11.

In an example shown in FIG. 2 viewed from an arrow of FIG. 1 in the direction II, the defroster air outlet 17 is shown by an alternate long and two short dashes line in order to make it easier to understand a positional relationship between the multiple diversion passages and the defroster air outlet 17. In this example, adjacent four cool air diversion passages 34 are disposed to occupy a majority part of the center air outlet 170 in the vehicle width direction. Both end parts of the center air outlet 170 in the vehicle width direction have a positional relationship such that the end part on one side corresponds to an other-side half of the first warm air diversion passage 32, and the end part on the other side corresponds to a one-side half of the second warm air diversion passage 33.

One side of the first side air outlet 171 in the vehicle width direction corresponds to adjacent two cool air diversion passages 34, and other side of the first side air outlet 171 in the vehicle width direction corresponds to a one-side half of the first warm air diversion passage 32. Other side of the second side air outlet 172 in the vehicle width direction corresponds to adjacent two cool air diversion passages 34, and one side of the second side air outlet 172 in the vehicle width direction corresponds to an other-side half of the second warm air diversion passage 33.

Therefore, as shown in FIG. 2, when the diversion passage section 30 is viewed from the defroster air outlet 17, a position of an outlet portion 323 of a tunnel defining the first warm air diversion passage 32 in the vehicle width direction and a position of a boundary portion 173, which separates the center air outlet 170 and the first side air outlet 171 in the vehicle width direction, in the vehicle width direction are overlapped with each other in an extending direction of the first warm air diversion passage 32, i.e. a direction perpendicular to the vehicle width direction. Further, a position of an outlet portion 333 of a tunnel defining the second warm air diversion passage 33 in the vehicle width direction and a position of a boundary portion 174, which separates the center air outlet 170 and the second side air outlet 172 in the vehicle width direction, in the vehicle width direction are overlapped with each other in an extending direction of the second warm air diversion passage 33, i.e. a direction perpendicular to the vehicle width direction.

The respective cool air diversion passages 34 are partitioned by partition walls 340 that partitions both end parts of the diversion passage section 30 in a direction perpendicular to the vehicle width direction, for example, in the vehicle front-rear direction. The first warm air diversion passage 32 and its outlet portion 323 are partitioned by a partition wall 325 from adjacent cool air diversion passage 34 on one side and partitioned by a partition wall 322 from adjacent cool air diversion passage 34 on other side. The second warm air diversion passage 33 and its outlet portion 333 are partitioned by a partition wall 332 from adjacent cool air diversion passage 34 on one side and partitioned by a partition wall 335 from adjacent cool air diversion passage 34 on other side. The cool air entering each cool air diversion passage 34 flows from the cool air passage 7 toward the air mixing portion 11 in a direction extending through the drawing paper of FIG. 2 from the back surface to the front surface.

The first warm air diversion passage 32 is provided near the first side air outlet 171 on one side in the vehicle width direction. The first warm air diversion passage 32 is a passage inside the tunnel that takes in the warm air flowing out of the warm air passage 10 without mixing with the cool air for supplying a large amount of the warm air to the first side air outlet 171. The first warm air diversion passage 32 is a tunnel-like passage that is defined by the partition wall 322, the partition wall 325, a communication wall portion 320 that bridges between a half of the partition wall 322 and a half of the partition wall 325 on an air-outlet side to cover in an upper part, and a communication wall portion (not shown in the drawings) that bridges on a side toward the heater core 9 to cover in a lower part. The warm air entering the first warm air diversion passage 32 flows upward in the drawing paper of FIG. 2 from the warm air passage 10 to the air mixing portion 11 so as to cross the above-described cool air flow.

The second warm air diversion passage 33 is provided near the second side air outlet 172 on other side in the vehicle width direction. The second warm air diversion passage 33 is a passage inside the tunnel that takes in the warm air flowing out of the warm air passage 10 without mixing with the cool air for supplying a large amount of the warm air to the second side air outlet 172. The second warm air diversion passage 33 is a tunnel-like passage that is defined by the partition wall 332, the partition wall 335, a communication wall portion 330 that bridges between a half of the partition wall 332 and a half of the partition wall 335 on an air-outlet side to cover in an upper part, and a communication wall portion (not shown in the drawings) that bridges on a side toward the heater core 9 to cover in a lower part. The warm air entering the second warm air diversion passage 33 flows upward in the drawing paper of FIG. 2 from the warm air passage 10 to the air mixing portion 11 so as to cross the above-described cool air flow.

An end part of the diversion passage section 30 on a side toward the warm air passage 10 (i.e. a lower end part of the diversion passage section 30 shown in FIG. 2) has a communication passage 31 that extends over an entire of the diversion passage section 30 in the vehicle width direction. The communication passage 31 communicates with the first warm air diversion passage 32, the second warm air diversion passage 33 and the respective cool air diversion passages 34. The communication passage 31 is a passage defined by lateral walls positioned on both end parts in the vehicle width direction and the communication wall portion 330 that bridges on the air-outlet side to cover in the upper part. Therefore, the communication passage 31 communicates with the warm air passage 10 via an opening portion that extends entirely in the vehicle width direction and opens downward, and communicates with the first warm air diversion passage 32 and the second warm air diversion passage 33.

The tunnel defining the first warm air diversion passage 32 has an in-tunnel guide wall 321 (in-passage guide wall) that protrudes toward one side from the partition wall 322 that is a boundary with the cool air diversion passage 34 adjacent on the other side. The in-tunnel guide wall 321 is an inner wall protruding toward the one side so as to gradually narrow a cross-sectional area of the first warm air diversion passage 32 toward the outlet portion 323. The in-tunnel guide wall 321 guides the warm air flowing on the other side in the first warm air diversion passage 32 so as to form a vector directed to the one side as shown by an arrow in FIG. 2. That is, the in-tunnel guide wall 321 is used as an example of a first guide that directs the warm air flowing in the first warm air diversion passage 32 to the first side air outlet 171.

The in-tunnel guide wall 321 and the partition wall 322 on the other side are bridged by a communication wall portion 324 on the air-outlet side so as to provide an upper cover. Hence, the outlet portion 323 of the first warm air diversion passage 32 is smaller than the first warm air diversion passage 32 in length in the vehicle width direction by a protrusion of the in-tunnel guide wall 321 toward the one side. Accordingly, the smaller passage width of the outlet portion 323 of the first warm air diversion passage 32 in the vehicle width direction contributes to blowing-out of the warm air, flowing in the first warm air diversion passage 32, toward the one side.

The tunnel defining the second warm air diversion passage 33 has an in-tunnel guide wall 331 (in-passage guide wall) that protrudes toward the other side from the partition wall 332 that is a boundary with the cool air diversion passage 34 adjacent on the one side. The in-tunnel guide wall 331 is an inner wall protruding toward the other side so as to gradually narrow a cross-sectional area of the second warm air diversion passage 33 toward the outlet portion 333. The in-tunnel guide wall 331 guides the warm air flowing on the one side in the second warm air diversion passage 33 so as to form a vector directed to the other side as shown by an arrow in FIG. 2. That is, the in-tunnel guide wall 331 is used as an example of a second guide that directs the warm air flowing in the second warm air diversion passage 33 to the second side air outlet 172.

The in-tunnel guide wall 331 and the partition wall 332 on the one side are bridged by a communication wall portion 334 on the air-outlet side so as to provide an upper cover. Hence, the outlet portion 333 of the second warm air diversion passage 33 is smaller than the second warm air diversion passage 33 in length in the vehicle width direction by a protrusion of the in-tunnel guide wall 331 toward the other side. Accordingly, the smaller passage width of the outlet portion 333 of the second warm air diversion passage 33 in the vehicle width direction contributes to blowing-out of the warm air, flowing in the second warm air diversion passage 33, toward the other side.

Actions and effects produced by the vehicle air conditioner according to the first embodiment will be described below. In the air conditioning unit 1, the diversion passage section 30 is provided downstream of the cool air passage 7 and the warm air passage 10 and upstream of the defroster air outlet 17 inside the air conditioning casing 1a. The diversion passage section 30 includes the multiple cool air diversion passages 34 communicating with the cool air passage 7, and the multiple warm air diversion passages communicating with the warm air passage 10. The first warm air diversion passage 32 that is one of the warm air diversion passages is provided near the first side air outlet 171 and is a passage inside the tunnel that takes in the warm air to flow therethrough without mixing with the cool air. The second warm air diversion passage 33 that is one of the warm air diversion passages is provided near the second side air outlet 172 and is a passage inside the tunnel that takes in the warm air to flow therethrough without mixing with the cool air. The diversion passage section 30 includes the first guide that directs the warm air flowing in the first warm air diversion passage 32 toward the first side air outlet 171, and the second guide that directs the warm air flowing in the second warm air diversion passage 33 toward the second side air outlet 172.

According to this configuration, in the defroster outlet mode, the respective conditioned airs, which have flowed in the cool air passage 7 and the warm air passage 10, flow smoothly out of the diversion passage section 30 by flowing through the multiple cool air diversion passages 34, the first warm air diversion passage 32 and the second warm air diversion passage 33. Hence, the respective conditioned airs are guided to the center air outlet 170, the first side air outlet 171 and the second side air outlet 172 of the defroster air outlet 17 in a balanced manner. Therefore, fogging of a window, such as a front window, can be prevented not only its center part in the vehicle width direction but entirely.

More specifically, the first warm air diversion passage 32 provided near the first side air outlet 171 and the second warm air diversion passage 33 provided near the second side air outlet 172 are separated from each other to have the cool air diversion passages 34 therebetween. Thus, the cool air and the warm air can be made to flow through the diversion passage section 30 without flowing intensively to a specific position (e.g., the center part) in the vehicle width direction. Accordingly, the cool air and the warm air can be supplied to the defroster air outlet 17 without largely breaking off a balance in their flow rates in the vehicle width direction, and an air conditioning performance can be achieved over a wide range of the front window or the like.

Further, the diversion passage section 30 includes the first guide that directs the warm air flowing in the first warm air diversion passage 32 toward the first side air outlet 171, and the second guide that directs the warm air flowing in the second warm air diversion passage 33 toward the second side air outlet 172. Hence, the flow rates of the warm airs toward the both side air outlets can be secured, and the warm air flowing through the first warm air diversion passage 32 and the warm air flowing through the second warm air diversion passage 33 can be prevented from flowing intensively to the center air outlet 170. Therefore, an imbalance state in flow rate between the cool air and the warm air that are supplied to the air mixing portion 11 can be limited. Additionally, with regard to the conditioned air blown from the defroster air outlet 17 into the vehicle compartment, blowing-out of the warm air intensively to the center of the defroster air outlet 17 in the vehicle width direction can be restricted. The air conditioning unit 1 capable of producing sufficient effects to prevent the window fogging over a wide range in the vehicle width direction can be provided.

At least one of the first guide and the second guide is the in-tunnel guide wall 321 or the in-tunnel guide wall 331 that is provided inside the tunnel defining the first warm air diversion passage 32 or the second warm air diversion passage 33 and guides the warm air.

According to this, a directional characteristic toward the side air outlets is given to the warm air in the tunnels, and thus the directional characteristic can be made to be insusceptible to a flow of the cool air, which is mixed with the warm air after flowing-out of the diversion passage section 30, from the cool air diversion passage 34. That is, since the directional characteristic is provided to the warm air in an early stage in the diversion passage section 30, a flow rate of the warm air reaching the first side air outlet 171 or the second side air outlet 172 can be secured from the warm air flowing out of the first warm air diversion passage 32 or the second warm air diversion passage 33. The effects to prevent the window fogging can be produced sufficiently over the wide range in the vehicle width direction.

The position of the outlet portion 323 of the tunnel defining the first warm air diversion passage 32 in the vehicle width direction and the position of the boundary portion 173, which separates the center air outlet 170 and the first side air outlet 171, in the vehicle width direction are overlapped with each other in the direction perpendicular to the vehicle width direction, i.e. the extending direction of the first warm air diversion passage 32. Further, the position of the outlet portion 333 of the tunnel defining the second warm air diversion passage 33 in the vehicle width direction and the position of the boundary portion 174, which separates the center air outlet 170 and the second side air outlet 172, in the vehicle width direction are overlapped with each other in the direction perpendicular to the vehicle width direction, i.e. the extending direction of the second warm air diversion passage 33.

Accordingly, a flow of the warm air, in which the warm air flowing out of the first warm air diversion passage 32 is distributed toward both the center air outlet 170 and the first side air outlet 171, can be easily generated. Further, a flow of the warm air, in which the warm air flowing out of the second warm air diversion passage 33 is distributed toward both the center air outlet 170 and the second side air outlet 172, can be easily generated. Since there is no need to provide a special directional characteristic such as a highly-intensive directional characteristic toward either the center air outlet or the side air outlets, a directional characteristic required to the first guide and the second guide can be set easily, and the cool air and the warm air can be balanced in flow rate with respect to the respective air outlets. Therefore, the air conditioning unit 1 capable of obtaining the effects to prevent the window fogging over the wide range in the vehicle width direction can be easily configured.

Second Embodiment

A diversion passage section to which the present disclosure is applied may include a variety of configurations. A diversion passage section 30A described in a second embodiment is an example of another configuration of the diversion passage section 30 of the first embodiment. In the second embodiment, configurations other than the diversion passage section 30A are similar to those of the first embodiment and have similar actions and effects. Different parts of the second embodiment from the first embodiment will be described referring to FIG. 3 below.

Figure 3:
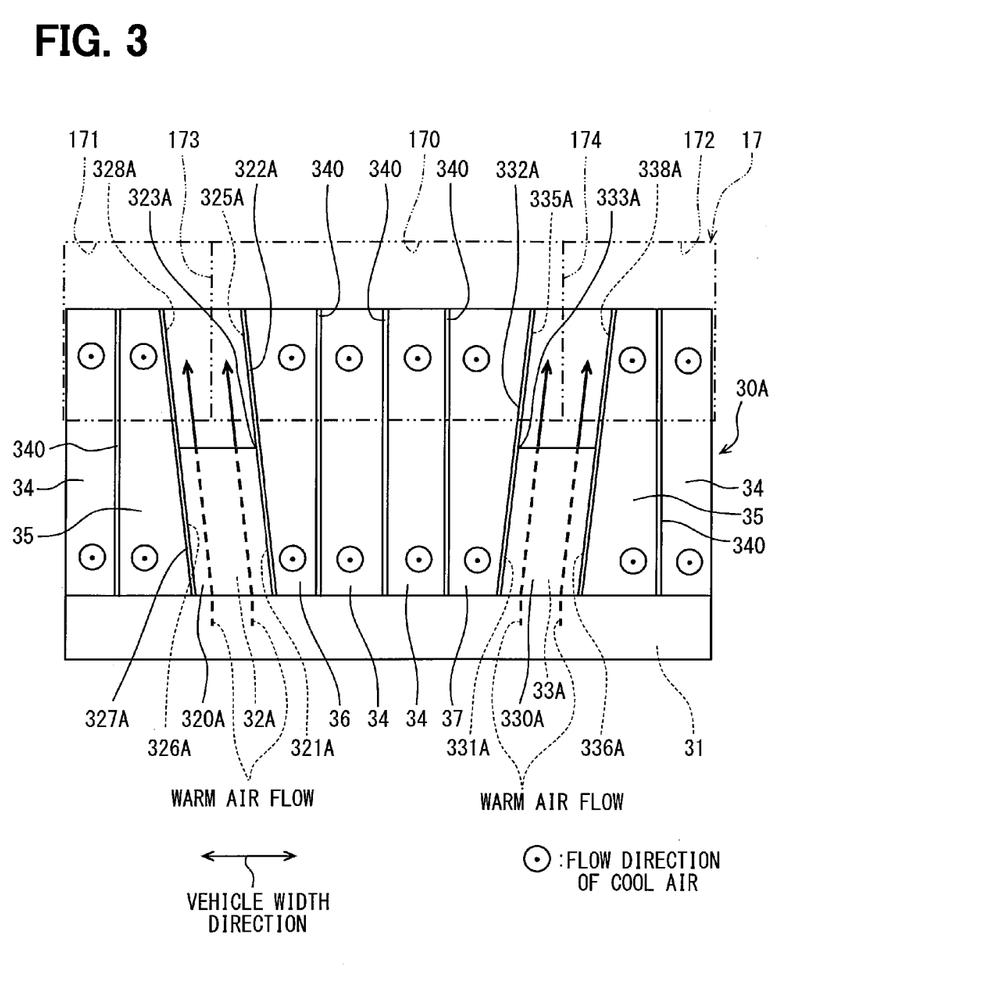
FIG. 3 is a schematic diagram showing a diversion passage section according to a second embodiment of the present disclosure.

As shown in FIG. 3, the diversion passage section 30A is different from the first embodiment in configurations of the first warm air diversion passage 32A and the second warm air diversion passage 33A. The first warm air diversion passage 32A is a tunnel-like passage that is defined by a partition wall 322A, a partition wall 327A, a communication wall portion 320A that bridges between a half of the partition wall 322A and a half of the partition wall 327A on an air-outlet side to cover in an upper part, and a communication wall portion (not shown in the drawings) that bridges on a side toward a heater core 9 to cover in a lower part.

The partition wall 322A is a boundary between the first warm air diversion passage 32A and an adjacent cool air diversion passage 36 on other side, and the partition wall 322A is inclined so as to extend to one side with extending to the vehicle front (downstream side). An inner wall of a tunnel on the other side, which defines the first warm air diversion passage 32A, has an in-tunnel guide wall 321A (in-passage guide wall) inclined so as to extend to the one side with extending to the vehicle front (downstream side). The partition wall 327A is a boundary between the first warm air diversion passage 32A and an adjacent cool air diversion passage 35 on the one side, and the partition wall 327A is inclined so as to extend to one side with extending to the vehicle front (downstream side). An inner wall of the tunnel on the one side, which defines the first warm air diversion passage 32A, has an in-tunnel guide wall 326A (in-passage guide wall) inclined so as to extend to the one side with extending to the vehicle front (downstream side).

The in-tunnel guide wall 321A and the in-tunnel guide wall 326A produce vectors in which the warm air flowing in the first warm air diversion passage 32A is directed toward the one side as shown by arrows of FIG. 3 inside the tunnel. In other words, the in-tunnel guide wall 321A and the in-tunnel guide wall 326A are used as examples of the first guide that directs the warm air flowing through the first warm air diversion passage 32A to flow toward the first side air outlet 171.

According to the configuration in which the partition wall 322A is inclined as described above, an outlet portion 323A of the tunnel defining the first warm air diversion passage 32A has an outlet-side guide wall 325A on the other side, and the outlet-side guide wall 325A is inclined so as to extend to the one side with extending to the vehicle front (downstream side). The outlet portion 323A of the tunnel of the first warm air diversion passage 32A has an outlet-side guide wall 328A on the one side, and the outlet-side guide wall 328A is inclined so as to extend to the one side with extending to the vehicle front (downstream side).

The outlet-side guide wall 325A and the outlet-side guide wall 328A produce vectors in which the warm air flowing out of the first warm air diversion passage 32A is directed toward the one side as shown by arrows of FIG. 3 outside the tunnel. In other words, the outlet-side guide wall 325A and the outlet-side guide wall 328A are used as examples of the first guide that directs the warm air flowing through the first warm air diversion passage 32A to flow toward the first side air outlet 171.

In the cool air diversion passage 35, a passage width on the vehicle front side (upper in the drawing paper of FIG. 3) is narrower than a passage width on the vehicle rear side (lower in the drawing paper of FIG. 3) because of the configuration in which the partition wall 327A is inclined as described above. A flow rate of the cool air flowing out of the cool air diversion passage 35 is reduced accordingly. An influence of the cool air on the warm air flowing out of the first warm air diversion passage 32A can be reduced, and a flow of the cool air can be formed such that the warm air is easily directed toward the first side air outlet 171. Therefore, a flow rate of the warm air reaching the first side air outlet 171 can be secured, and effects to prevent window fogging can be produced sufficiently over a wide range of the vehicle width direction.

In the cool air diversion passage 36, a passage width on the vehicle rear side (lower in the drawing paper of FIG. 3) is narrower than a passage width on the vehicle front side (upper in the drawing paper of FIG. 3) because of the configuration in which the partition wall 322A is inclined as described above.

The second warm air diversion passage 33A is a tunnel-like passage that is defined by a partition wall that is a boundary with a cool air diversion passage 35, a partition wall that is a boundary with a cool air diversion passage 37, a communication wall portion 330A that bridges between halves of these partition walls on an air-outlet side to cover in an upper part, and a communication wall portion (not shown in the drawings) that bridges on a side toward a heater core 9 to cover in a lower part. The partition wall 332A, which is the boundary between the second warm air diversion passage 33A and the adjacent cool air diversion passage 37 on the one side, is inclined so as to extend to the other side with extending to the vehicle front (downstream side). An inner wall of a tunnel on the one side, which defines the second warm air diversion passage 33A, has an in-tunnel guide wall 331A (in-passage guide wall) that is inclined so as to extend to the other side with extending to the vehicle front (downstream side). The partition wall, which is the boundary between the second warm air diversion passage 33A and the adjacent cool air diversion passage 35 on the other side, is inclined so as to extend to the other side with extending to the vehicle front (downstream side). An inner wall of the tunnel of the second warm air diversion passage 33A on the other side has an in-tunnel guide wall 336A (in-passage guide wall) that is inclined so as to extend to the other side with extending to the vehicle front (downstream side).

The in-tunnel guide wall 331A and the in-tunnel guide wall 336A produce vectors in which the warm air flowing in the second warm air diversion passage 33A is directed toward the other side as shown by arrows of FIG. 3 inside the tunnel. In other words, the in-tunnel guide wall 331A and the in-tunnel guide wall 336A are used as examples of the second guide that directs the warm air flowing through the second warm air diversion passage 33A to flow toward the second side air outlet 172.

According to the configuration in which the partition wall 332A is inclined as described above, an outlet portion 333A of the tunnel defining the second warm air diversion passage 33A has an outlet-side guide wall 335A on the one side, and the outlet-side guide wall 335A is inclined so as to extend to the other side with extending to the vehicle front (downstream side). The outlet portion 333A of the tunnel of the second warm air diversion passage 33A has an outlet-side guide wall 338A on the other side, and the outlet-side guide wall 338A is inclined so as to extend to the other side with extending to the vehicle front (downstream side).

The outlet-side guide wall 335A and the outlet-side guide wall 338A produce vectors in which the warm air flowing out of the second warm air diversion passage 33A is directed toward the other side as shown by arrows of FIG. 3 outside the tunnel. In other words, the outlet-side guide wall 335A and the outlet-side guide wall 338A are used as examples of the second guide that directs the warm air flowing through the second warm air diversion passage 33A to flow toward the second side air outlet 172.

In the cool air diversion passage 35, a passage width on the vehicle front side (upper in the drawing paper of FIG. 3) is narrower than a passage width on the vehicle rear side (lower in the drawing paper of FIG. 3) because of the configuration in which the partition wall between the cool air diversion passage 35 and the second warm air diversion passage 33A is inclined as described above. A flow rate of the cool air flowing out of the cool air diversion passage 35 is reduced accordingly. An influence of the cool air on the warm air flowing out of the second warm air diversion passage 33A can be reduced, and a flow of the cool air can be formed such that the warm air is easily directed toward the second side air outlet 172. Therefore, a flow rate of the warm air reaching the second side air outlet 172 can be secured, and effects to prevent the window fogging can be produced sufficiently over the wide range of the vehicle width direction.

In the cool air diversion passage 37, a passage width on the vehicle rear side (lower in the drawing paper of FIG. 3) is narrower than a passage width on the vehicle front side (upper in the drawing paper of FIG. 3) because of the configuration in which the partition wall 332A is inclined as described above.

Third Embodiment

A diversion passage section 30B described in a third embodiment is an example of another configuration of the diversion passage section 30 of the first embodiment. In the third embodiment, configurations other than the diversion passage section 30B are similar to those of the first embodiment and have similar actions and effects. Different parts of the third embodiment from the first embodiment will be described referring to FIG. 4 below.

Figure 4:
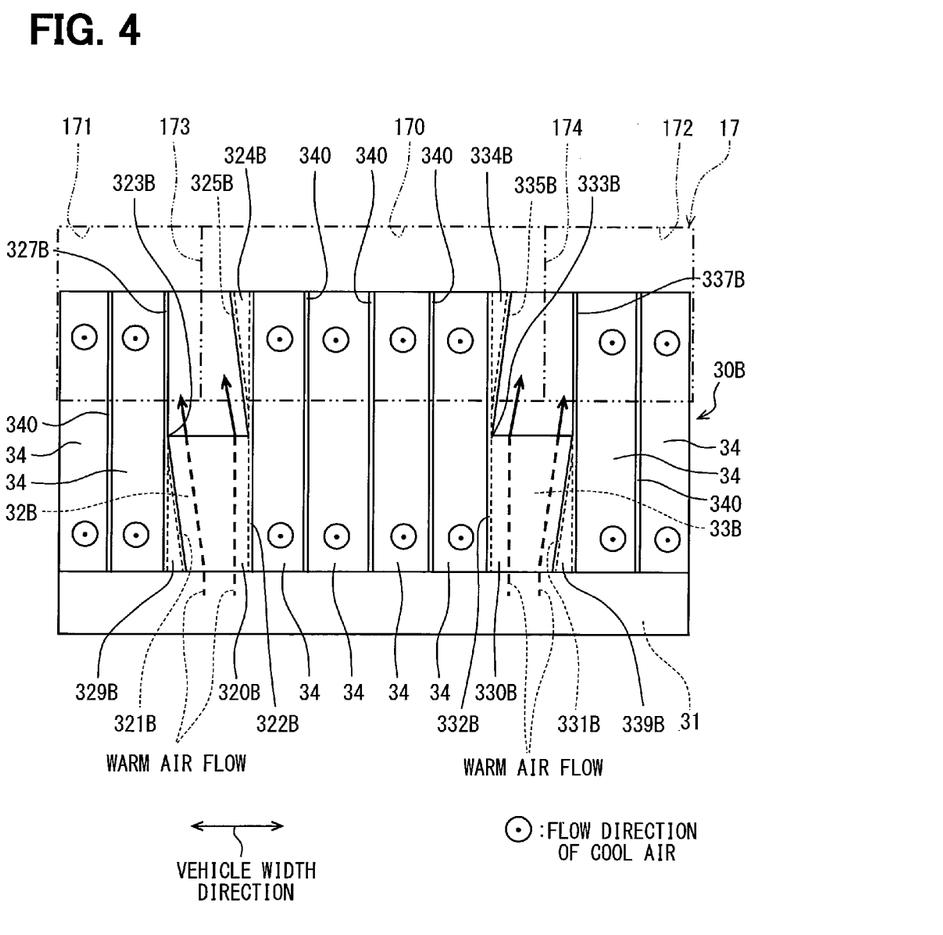
FIG. 4 is a schematic diagram showing a diversion passage section according to a third embodiment of the present disclosure.

As shown in FIG. 4, the diversion passage section 30B of the third embodiment is different from the first embodiment in configurations of a first warm air diversion passage 32B and a second warm air diversion passage 33B. The first warm air diversion passage 32B is a tunnel-like passage that is defined by a partition wall 322B, a partition wall 327B, a communication wall portion 320B that bridges between a half of the partition wall 322B and a half of the partition wall 327B on an air-outlet side to cover in an upper part, and a communication wall portion (not shown in the drawings) that bridges on a side toward a heater core 9 to cover in a lower part. The second warm air diversion passage 33B is a tunnel-like passage that is defined by a partition wall 332B, a partition wall 337B, a communication wall portion 330B that bridges between a half of the partition wall 332B and a half of the partition wall 337B on an air-outlet side to cover in an upper part, and a communication wall portion (not shown in the drawings) that bridges on the side toward the heater core 9 to cover in a lower part.

An inner wall of a tunnel on one side, which defines the first warm air diversion passage 32B, has an in-tunnel guide wall 321B (in-passage guide wall) that is inclined so as to extend to the one side with extending to a vehicle front (downstream side). The in-tunnel guide wall 321B is an inner wall that protrudes to the other side on an upstream position so as to increase a cross-sectional area of the first warm air diversion passage 32B toward an outlet portion 323B. The in-tunnel guide wall 321B guides the warm air flowing on one side of the first warm air diversion passage 32B so as to produce a vector directed to the one side as shown by an arrow of FIG. 4. In other words, the in-tunnel guide wall 321B is used as an example of the first guide that directs the warm air flowing through the first warm air diversion passage 32B toward the first side air outlet 171.

The in-tunnel guide wall 321B and the partition wall 327B on the one side are bridged by a communication wall portion 329B on the air-outlet side such that an upper cover is provided. According to this configuration, in the first warm air diversion passage 32B, an upstream side is shorter in dimension in the vehicle width direction than a downstream side by a protrusion of the in-tunnel guide wall 321B toward the other side.

An inner wall of the outlet portion 323B of the tunnel of the first warm air diversion passage 32B on the other side has an outlet-side guide wall 325B that is inclined so as to extend to the one side with extending to the vehicle front (downstream side). The outlet-side guide wall 325B is an inner wall that protrudes to the one side on a downstream side position so as to reduce a length of the outlet portion 323B in the vehicle width direction. The outlet-side guide wall 325B guides the warm air flowing out of other side of the outlet portion 323B so as to produce a vector directed to the one side as show by an arrow of FIG. 4. In other words, the outlet-side guide wall 325B is used as an example of the first guide that directs the warm air flowing out of the first warm air diversion passage 32B toward the first side air outlet 171.

The outlet-side guide wall 325B and the partition wall 322B on the other side are bridged by a communication wall portion 324B on the air-outlet side such that an upper cover is provided. According to this configuration, in the outlet portion 323B of the first warm air diversion passage 32B, an upstream side is longer in dimension in the vehicle width direction than a downstream side by a protrusion of the outlet-side guide wall 325B toward the one side.

An inner wall of a tunnel on the other side, which defines the second warm air diversion passage 33B, has an in-tunnel guide wall 331B (in-passage guide wall) that is inclined so as to extend to the other side with extending to the vehicle front (downstream side). The in-tunnel guide wall 331B is an inner wall that protrudes to the one side on an upstream position so as to increase a cross-sectional area of the second warm air diversion passage 33B toward an outlet portion 333B. The in-tunnel guide wall 331B guides the warm air flowing on other side of the second warm air diversion passage 33B so as to produce a vector directed to the other side as shown by an arrow of FIG. 4. In other words, the in-tunnel guide wall 331B is used as an example of the second guide that directs the warm air flowing through the second warm air diversion passage 33B toward the second side air outlet 172.

The in-tunnel guide wall 331B and the partition wall 337B on the other side are bridged by a communication wall portion 339B on the air-outlet side such that an upper cover is provided. According to this configuration, in the second warm air diversion passage 33B, an upstream side is shorter in dimension in the vehicle width direction than a downstream side by a protrusion of the in-tunnel guide wall 331B toward the one side.

An inner wall of the outlet portion 333B of the tunnel of the second warm air diversion passage 33B on the one side has an outlet-side guide wall 335B that is inclined so as to extend to the other side with extending to the vehicle front (downstream side). The outlet-side guide wall 335B is an inner wall that protrudes to the other side on a downstream side position so as to reduce a length of the outlet portion 333B in the vehicle width direction. The outlet-side guide wall 335B guides the warm air flowing out of one side of the outlet portion 333B so as to produce a vector directed to the other side as show by an arrow of FIG. 4. In other words, the outlet-side guide wall 335B is used as an example of the second guide that directs the warm air flowing out of the second warm air diversion passage 33B toward the second side air outlet 172.

The outlet-side guide wall 335B and the partition wall 332B on the one side are bridged by a communication wall portion 334B on the air-outlet side such that an upper cover is provided. According to this configuration, in the outlet portion 333B of the second warm air diversion passage 33B, an upstream side is longer in dimension in the vehicle width direction than a downstream side by a protrusion of the outlet-side guide wall 335B toward the other side.

Fourth Embodiment

A positional relationship between a diversion passage section, to which the present disclosure is applied, and a defroster air outlet may include a variety of configurations. A positional relationship described in a fourth embodiment is an example of another configuration of the first embodiment. In the fourth embodiment, configurations other than the positional relationship between a diversion passage section 30 and a defroster air outlet 17A are similar to those of the first embodiment and have similar actions and effects. Different parts of the fourth embodiment from the first embodiment will be described referring to FIG. 5 below.

Figure 5:
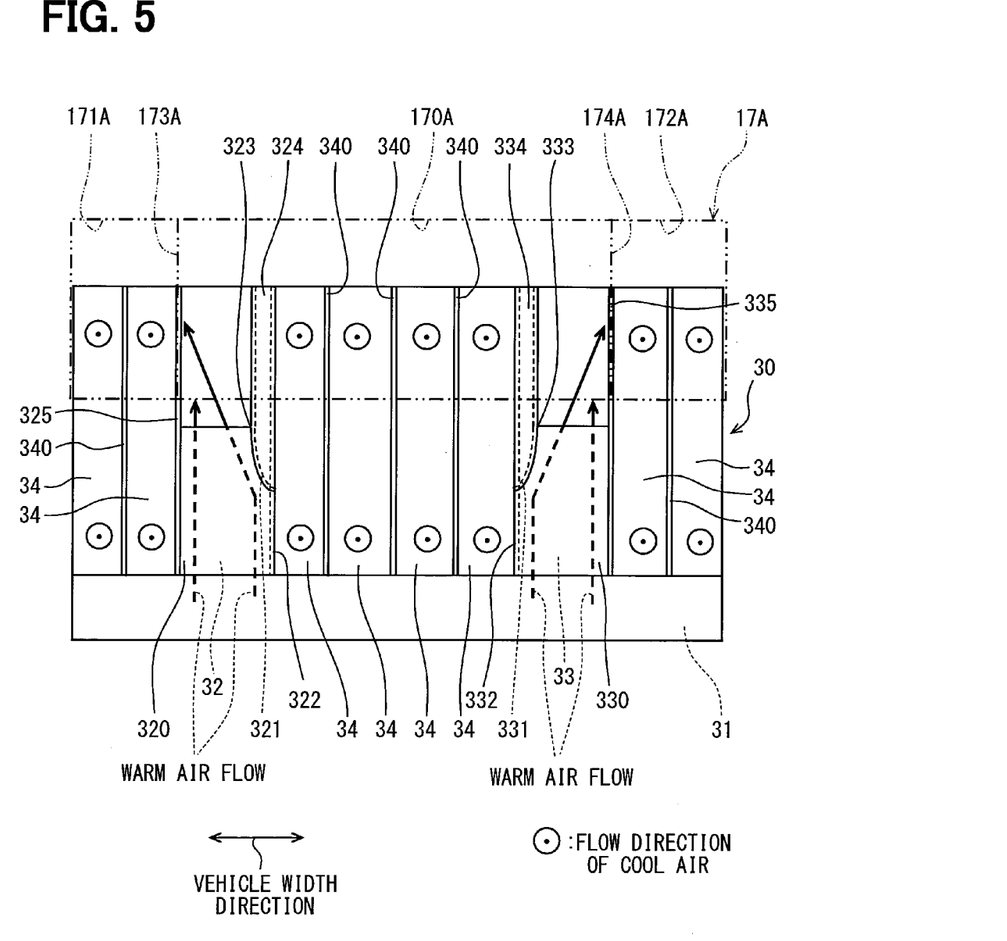
FIG. 5 is a schematic diagram showing a diversion passage section according to a fourth embodiment of the present disclosure.

As shown in FIG. 5, when the diversion passage section 30 is viewed from the defroster air outlet 17A, a boundary portion 173A, which separates a center air outlet 170A and a first side air outlet 171A in a vehicle width direction, has a positional relationship to be coincident or almost overlapped with a partition wall 325 in the vehicle width direction. In other words, an outlet portion 323 of a tunnel defining a first warm air diversion passage 32 has a positional relationship to be overlapped with one side part of the center air outlet 170A in the vehicle width direction. One-side end part of the center air outlet 170A is shifted toward one-side end part of the diversion passage section 30 more than the center air outlet 170 of the first embodiment.

Also, a boundary portion 174A, which separates the center air outlet 170A and a second side air outlet 172A in the vehicle width direction, has a positional relationship to be almost overlapped with a partition wall 335 in the vehicle width direction. In other words, an outlet portion 333 of a tunnel defining a second warm air diversion passage 33 has a positional relationship to be overlapped with other side part of the center air outlet 170A in the vehicle width direction. Other-side end part of the center air outlet 170A is shifted toward other-side end part of the diversion passage section 30 more than the center air outlet 170 of the first embodiment.

Also in the fourth embodiment, warm air flowing on the other side of the first warm air diversion passage 32 is guided to have a vector that is changed to the one side as shown by an arrow of FIG. 5. In other words, an in-tunnel guide wall 321 is used as an example of the first guide that directs the warm air flowing through the first warm air diversion passage 32 toward the first side air outlet 171A, and produces similar actions and effects to the first embodiment. Further, the warm air flowing on the one side of the second warm air diversion passage 33 is guided to have a vector that changes toward the other side as shown by an arrow of FIG. 5. In other words, an in-tunnel guide wall 331 is used as an example of the second guide that directs the warm air flowing through the second warm air diversion passage 33 toward the second side air outlet 172A, and produces similar actions and effects to the first embodiment.

Fifth Embodiment

A positional relationship between a diversion passage section, to which the present disclosure is applied, and a defroster air outlet may include a variety of configurations. A positional relationship described in a fifth embodiment is an example of another configuration of the first embodiment. In the fifth embodiment, configurations other than the positional relationship between a diversion passage section 30 and a defroster air outlet 17B are similar to those of the first embodiment and have similar actions and effects. Different parts of the fifth embodiment from the first embodiment will be described referring to FIG. 6 below.

Figure 6:
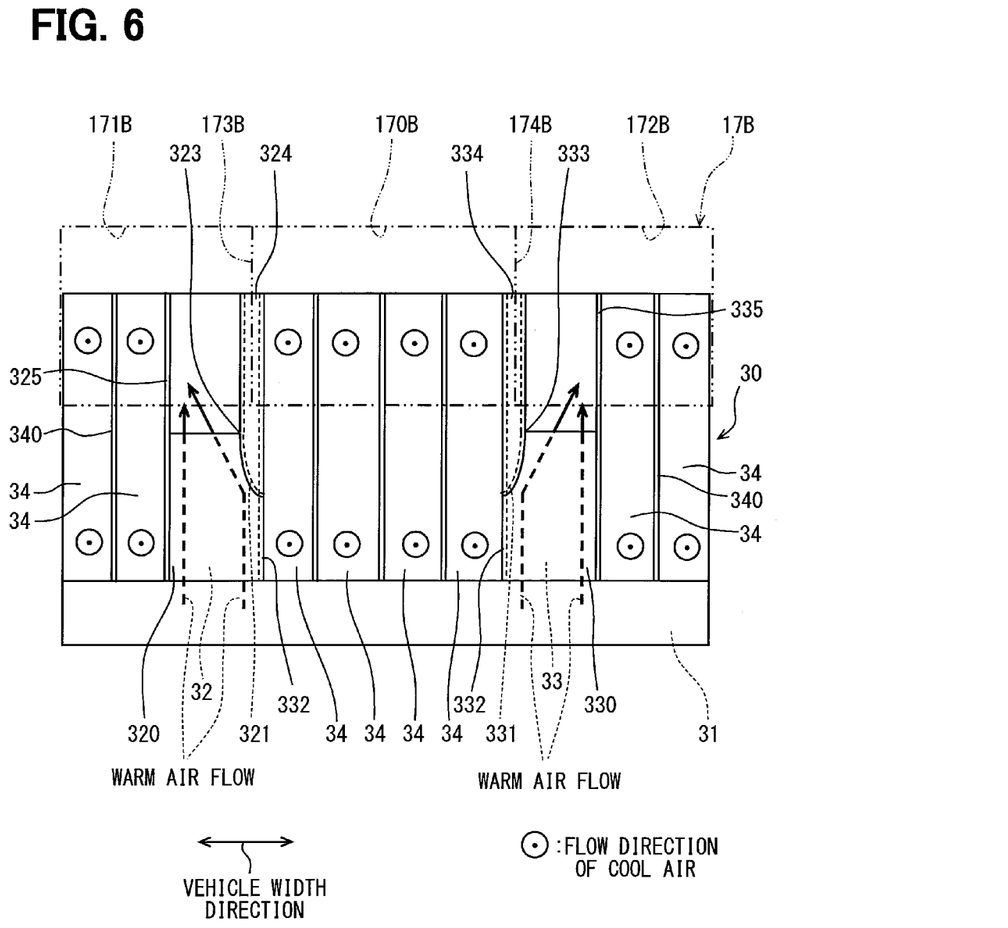
FIG. 6 is a schematic diagram showing a diversion passage section according to a fifth embodiment of the present disclosure.

As shown in FIG. 6, when the diversion passage section 30 is viewed from the defroster air outlet 17B, a boundary portion 173B, which separates a center air outlet 170B and a first side air outlet 171B in a vehicle width direction, has a positional relationship to be coincident or almost overlapped with a communication wall portion 324 in the vehicle width direction. In other words, an outlet portion 323 of a tunnel defining a first warm air diversion passage 32 has a positional relationship to be overlapped with the first side air outlet 171B in the vehicle width direction. One-side end part of the center air outlet 170B does not have a positional relationship to be overlapped with the first warm air diversion passage 32.

Also, a boundary portion 174B, which separates the center air outlet 170B and a second side air outlet 172B in the vehicle width direction, has a positional relationship to be coincident or almost overlapped with a communication wall portion 334 in the vehicle width direction. In other words, an outlet portion 333 of a tunnel defining a second warm air diversion passage 33 has a positional relationship to be overlapped with the second side air outlet 172B in the vehicle width direction. Other-side end part of the center air outlet 170B does not have a positional relationship to be overlapped with the second warm air diversion passage 33.

Also in the fifth embodiment, warm air flowing on the other side of the first warm air diversion passage 32 is guided to have a vector that is changed to the one side as shown by an arrow of FIG. 6. In other words, an in-tunnel guide wall 321 is used as an example of the first guide that directs the warm air flowing through the first warm air diversion passage 32 toward the first side air outlet 171B, and produces similar actions and effects to the first embodiment. Further, the warm air flowing on the one side of the second warm air diversion passage 33 is guided to have a vector that changes toward the other side as shown by an arrow of FIG. 6. In other words, an in-tunnel guide wall 331 is used as an example of the second guide that directs the warm air flowing through the second warm air diversion passage 33 toward the second side air outlet 172B, and produces similar actions and effects to the first embodiment.

Other Embodiments

In the above, the preferable embodiments of the present disclosure are described, but the present disclosure is not limited to the above-described embodiments and can be modified variously to be exploited without departing from the scope of the present disclosure. The structures of the above-described embodiments are just examples, and a range of the present disclosure is not limited to ranges of these descriptions.

In the above-described embodiments, when the diversion passage section is viewed from the defroster air outlet, a part of the defroster air outlet on the vehicle rear side has a relationship to be overlapped with a part of the diversion passage section on the vehicle front side. However, a positional relationship between the defroster air outlet and the diversion passage section, according to the present disclosure, is not intended to be limited to the embodiments. For example, the defroster air outlet and the diversion passage section just have to have the positional relationship described in the above-described embodiments in the vehicle width direction, and are not necessarily overlapped with each other in the vehicle front-rear direction.

What is claimed is:
1. An air conditioner for a vehicle, comprising:
   an air conditioning casing having therein a passage through which a conditioned air flows to an inside of a vehicle compartment;

a defroster air outlet provided on the air conditioning casing, the defroster air outlet being an outlet through which the conditioned air is blown toward a window in the vehicle compartment;

a cooling heat exchanger disposed inside the air conditioning casing, the cooling heat exchanger absorbing heat from air passing therethrough and supplying cool air downstream in an air flow;

a heating heat exchanger disposed inside the air conditioning casing, the heating heat exchanger radiating heat to air passing therethrough and supplying warm air downstream in an air flow;

a cool air passage provided in the air conditioning casing, the cool air passage being a passage through which the cool air that has been cooled in the cooling heat exchanger flows;

a warm air passage provided in the air conditioning casing, the warm air passage being a passage through which the warm air that has been heated in the heating heat exchanger flows;

a diversion passage section provided downstream of the cool air passage and the warm air passage in the air flow and upstream of the defroster air outlet in the air flow inside the air conditioning casing, the diversion passage section including a plurality of cool air diversion passages communicating with the cool air passage, and a plurality of warm air diversion passages communicating with the warm air passage; and an air mixing portion provided upstream of the defroster air outlet in the air flow inside the air conditioning casing, the air mixing portion being a portion in which the cool air flowing out of the plurality of cool air diversion passages and the warm air flowing out of the plurality of warm air diversion passages are mixed with each other, wherein the defroster air outlet includes a first side air outlet through which the conditioned air passes to be blown to one of both side parts in a vehicle width direction in the vehicle compartment, a second side air outlet through which the conditioned air passes to be blown to other of the both side parts in the vehicle width direction in the vehicle compartment, and a center air outlet provided between the first side air outlet and the second side air outlet in the vehicle width direction, the plurality of warm air diversion passages includes at least a first warm air diversion passage and a second warm air diversion passage that are separated from each other in the vehicle width direction, at least one of the plurality of cool air diversion passages is disposed adjacent to the first warm air diversion passage and the second warm air diversion passage between the first warm air diversion passage and the second warm air diversion passage in the vehicle width direction, the first warm air diversion passage is provided near the first side air outlet and is a passage through which the warm air from the warm air passage flows without mixing with the cool air flowing out of the cool air passage, the second warm air diversion passage is provided near the second side air outlet and is a passage through which the warm air from the warm air passage flows without mixing with the cool air flowing out of the cool air passage, and the diversion passage section includes a first guide that directs the warm air flowing through the first warm air diversion passage toward the first side air outlet, and a second guide that directs the warm air flowing through the second warm air diversion passage toward the second side air outlet.

2. The air conditioner according to claim 1, wherein at least one of the first guide and the second guide is an in-passage guide wall provided in an inside of either the first warm air diversion passage or the second warm air diversion passage.

3. The air conditioner according to claim 1, wherein at least one of the first guide and the second guide is an outlet-side guide wall provided in an outlet portion of either the first warm air diversion passage or the second warm air diversion passage.

4. The air conditioner according to claim 1, wherein the first warm air diversion passage and the second warm air diversion passage extend in a direction perpendicular to the vehicle width direction, a position of an outlet portion of the first warm air diversion passage in the vehicle width direction and a position of a boundary portion, which separates the center air outlet and the first side air outlet, in the vehicle width direction are overlapped with each other in an extending direction of the first warm air diversion passage, and a position of an outlet portion of the second warm air diversion passage in the vehicle width direction and a position of a boundary portion, which separates the center air outlet and the second side air outlet, in the vehicle width direction are overlapped with each other in an extending direction of the second warm air diversion passage.

* * * * *